United States Patent [19]

Abraham

[11] 3,737,248
[45] June 5, 1973

[54] ROTARY ENGINE
[76] Inventor: Erich E. Abraham, 3400 20th Avenue, S.W., Largo, Fla. 33540
[22] Filed: Nov. 15, 1971
[21] Appl. No.: 198,739

[52] U.S. Cl. ............... 415/198, 415/199, 415/202
[51] Int. Cl. .......................... F04d 29/40, F01d 1/10
[58] Field of Search .................. 60/39.44; 415/202, 415/203, 199 A, 198

[56] References Cited
UNITED STATES PATENTS

| | | | |
|---|---|---|---|
| 625,731 | 5/1899 | Ames | 415/202 |
| 751,842 | 2/1904 | Ericson | 415/203 |
| 845,762 | 3/1907 | Crary | 415/203 |
| 861,377 | 7/1907 | Macropoulos | 415/203 |
| 865,164 | 9/1907 | Corthesy | 415/202 |
| 3,522,703 | 8/1970 | Toth | 60/39.44 |

FOREIGN PATENTS OR APPLICATIONS

| 121 | 1902 | Great Britain | 415/203 |
|---|---|---|---|

*Primary Examiner*—Henry F. Raduazo
*Attorney*—Robert W. Duckworth and William M. Hobby

[57] ABSTRACT

A rotary steam engine apparatus is provided having rotors mounted on a shaft and enclosed in a housing with input and output steam ports for driving the rotors. Each rotor has at least one chamber having a generally arcuate teardrop cross section shape adapted for opening and closing the input and otput ports in a predetermined cycle.

4 Claims, 6 Drawing Figures

PATENTED JUN 5 1973

3,737,248

INVENTOR.
Erich E. Abraham
BY Duckworth & Hobby
ATTY'S.

ROTARY ENGINE

BACKGROUND OF THE INVENTION

The present invention relates to rotary engines and more particularly to a rotary engine especially adapted to be used as a steam engine.

In the past many types of engines have been suggested and utilized with the most common types being standard reciprocating piston engines, radial piston engines and various types of turbines. Rotary engines have also been commonly suggested to avoid the use of reciprocating parts to increase the efficiency of the engine by saving the energy wasted in converting reciprocal motion to rotary motion. Many of these rotary machines have been tested but have had little success in competing with the smaller reciprocating engines. Some of the prior art rotary engines have included a flap type piston rotating inside a cylinder with either steam pressure or internal combustion causing the rotation of the pistons. It has also been suggested to mount a rotating piston eccentrically in relation to the main shaft, and many complicated arrangements of levers and gear have been tried as have multiple rotation pistons. In contrast to the more limited success of the rotary combustion type engines, rotary compressors have proved quite successful in pumps, blowers, and the like, and one of the most common types of compressors utilized for air conditioners, uses a rotary or drum set in a housing with its axis eccentrically mounted on a rotating shaft and a radial blade sliding in a slot to produce a gas tight fit between the intake and exhaust of the compressor.

In recent years, a great deal of attention has been given to rotary combustion engines such as the "Wankle" engine in which a triangular piston with convex sides rotates on a shaft and a housing having an oval shape with the middle of the oval slightly constricted. The triangular piston in this type of engine has seals mounted on each of its corners, which seals continuously ride along the walls of the oval housing.

In contrast to the prior art engines, the present engine is directed to a rotary steam engine having an improved shaped rotor therein for increasing the efficiency in utilizing the steam and avoiding the complexities of the eccentric mounted rotary engines.

SUMMARY OF THE INVENTION

A rotary type steam engine is provided having one or more rotors mounted on a main shaft and being adapted to rotate with the shaft. A housing encloses each rotor and has at least two end plates at either end thereof with dividing sections dividing any two rotors from each other. The housing and the rotors define expansion chambers having a cross section of a generally arcuate teardrop shape and flat surfaces on either side. That is, the expansion chamber rides along a circular outer housing and has the chamber cut into the rotor with an arcuate wall curving from the outer housing into a U-shaped enlarged portion and back to the housing. Input and output ports allow steam to enter the expansion chambers and to leave at predetermined points, with the ports being opened and closed by the rotation of the rotor.

BRIEF DESCRIPTION OF THE DRAWINGS

Other objects, features and advantages of this invention will be apparent from a study of the written description and the drawings in which.

DESCRIPTION OF THE PREFERRED EMBODIMENTS

Figure 1:
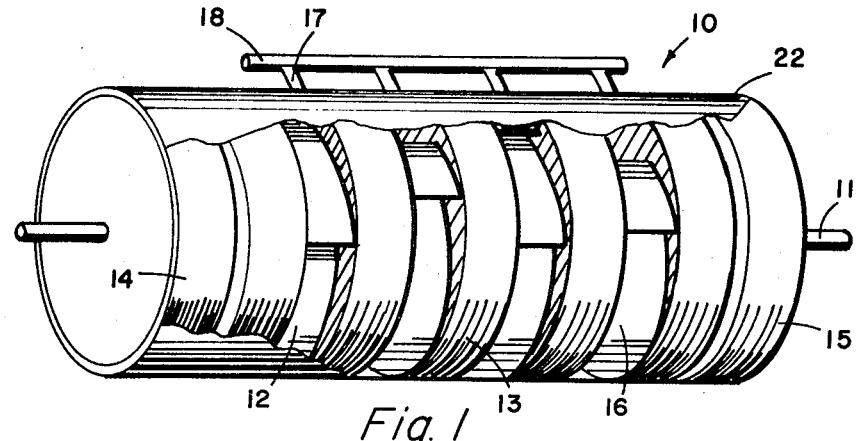
FIG. 1 illustrates a cutaway perspective view of the present engine having four rotors.

Referring now to FIG. 1, the main portion of a steam engine is illustrated at 10 having a shaft 11 attached to a plurality of rotors 12, each two rotors being divided by dividing sections 13 and having a pair of end sections 14 and 15. Shaft 11 rides on the end sections 14 and 15 which may include bearings, bushings, or the like, for supporting the shaft 11, rotors 12 and dividing sections 13. As can be seen from this view, each rotor defines an expansion chamber 16 with each expansion chamber for each rotor being located in a different position relative to the next rotor. A plurality of exhaust ports 17 are illustrated feeding into a common header unit 18. Similarly, a plurality of input ports are utilized but cannot be seen in this view, but at least one port will feed to each rotor. The dividing sections 13 may be attached to rotors 12 and rotate therewith or may be fixed to the housing 22.

Figures 2, 3, 4:
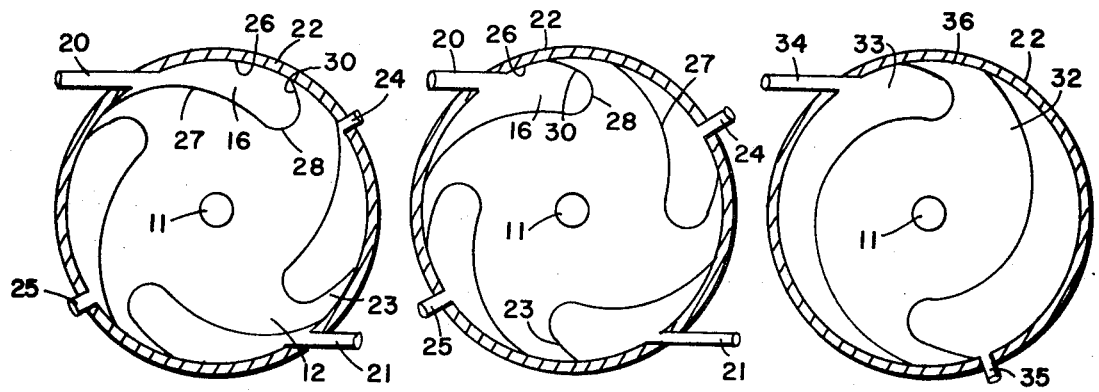
FIG. 2 illustrates a cross section of one rotor.
FIG. 3 illustrates a second embodiment of a rotor.
FIG. 4 illustrates yet another embodiment of a rotor.
Figures 5, 6:
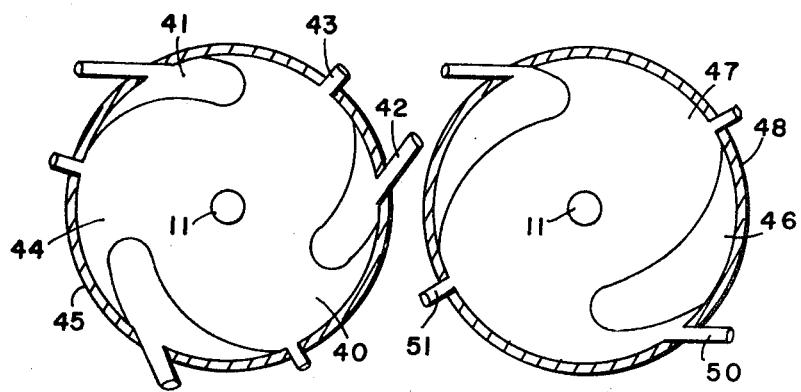
FIG. 5 illustrates another embodiment of a rotor.
FIG. 6 illustrates another embodiment of a rotor for use in accordance with the present invention.

Turning now to FIGS. 2 through 6, five separate rotor embodiments are illustrated each having a similar shaped expansion chamber. FIGS. 2 and 3 illustrate the same embodiment except FIG. 2 having the intake ports 20 and 21 passing through the housing 22 and opening into the expansion chambers 16 just prior to being closed off by the rotor 12 housing contact portion 23. The rotor 12 is riding on shaft 11 and the exhaust ports 24 and 25 are about to be opened just as the intake ports 21 and 20 are closed by the sections 23. Each chamber 16 rides on the circular or arcuate internal walls 26 of the housing 22, and defines a chamber of a generally arcuate teardrop shape having an arcuate wall 27 extending from the interior 26 of the housing 22 into a U-shaped enlarged section 28 and into a wall 30 extending back to the housing 22. This shape has been found to provide a particularly efficient rotation of the engine by the expansion of the steam being fed to the chamber through the intake ports. FIG. 3 has the same embodiments as FIG. 4 except for the rotor being positioned with the input ports being open to two of the chambers 16 with the exhaust ports 24 and 25 being opened to the other two chambers, and a four chamber rotor. FIG. 4 illustrates a rotor 32 having only two combustion chambers 33 which are accordingly more elongated teardrop shapes and having input ports 34, exhaust ports 35 located in different positions. The head sections 36 ride on the housing 22 the same as for all of the embodiments. FIG. 5 illustrates an embodiment having a rotor 40 having three combustion chambers 41 and 3 sets of input ports 42 and exhaust ports 43. Combustion chambers 41 have the same general shape except that more of the rotor section 44 rides on the housing 45, the rotors of course are fixedly attached for rotation with the shaft 11. FIG. 6 illustrates an embodiment having two combustion chambers 46 and a rotor 47 riding on a shaft 11 in a housing 48 similar to the embodiment illustrated in FIG. 4 except for the location of the input ports 50 and the exhaust ports 51. The steam enters the expansion chambers 16, 33, 41 and 46 of the embodiment of FIGS. 1 through 6, through input ports 20, 34, 42 and 50 respectively, for expansion in the expansion chambers. Once the expansion is completed the steam is exhausted through the exhaust ports 25, 35, 43 and 51, while the input ports are being closed off or opened to the next chamber. In each case, the engine may be driven similar to an expanding piston or may be driven more in the nature of a steam turbine, if desired.

It should be clear at this point that a simplified steam engine has been provided and only those portions necessary for the understanding of the invention have been shown. It will of course be clear that it is contemplated that a steam boiler such as flash boilers and cooling condensers would be provided with the engine. These are of course contemplated.

This invention is not to be construed as limited to the particular forms disclosed herein since these are to be regarded as illustrative rather than restrictive.

I claim:
1. A rotary engine comprising in combination:
   a. a plurality of connected rotors mounted on a main shaft and adapted to rotate with said shaft, each said rotor having a plurality of chambers formed therein;
   b. a plurality of dividing sections separating each rotor from the next said rotor;
   c. housing means enclosing said plurality of rotors and including two end plates;
   d. a plurality of input and output ports directing steam through each said input port into a rotor chamber and exhausting steam through each output port from a rotor chamber;
   e. each said rotor being enclosed by said housing means and defining a plurality of enclosed chambers with said rotor chambers, each enclosed chamber having a generally arcuate teardrop cross section having flat sides, and each rotor chamber being open to the interior of said housing means by a predetermined length to allow only one input or output port to be open to any one chamber at a time; and each said rotor chamber being located in a different angular position around said shaft, said plurality of input and output ports including one input and one output port for each rotor chamber whereby said rotor will open and close said input and output ports in a predetermined cycle and will drive a plurality of rotors simultaneously.

2. The apparatus according to claim 1 in which there are two chambers defined by each rotor.

3. The apparatus according to claim 1 in which there are three chambers defined by each rotor.

4. The apparatus according to claim 1 in which there are four chambers defined by each rotor.

* * * * *